Feb. 21, 1950     A. MOEBES ET AL     2,498,288
AUTOMATIC EJECTOR FOR KEYS
Filed April 6, 1948
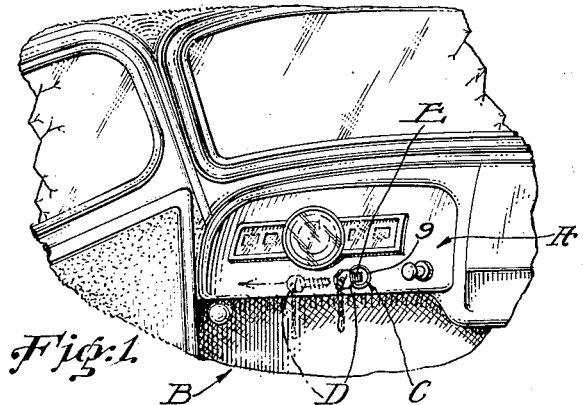
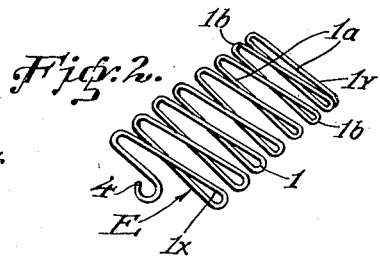
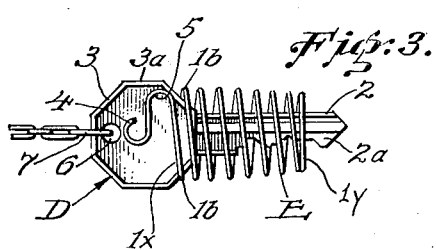
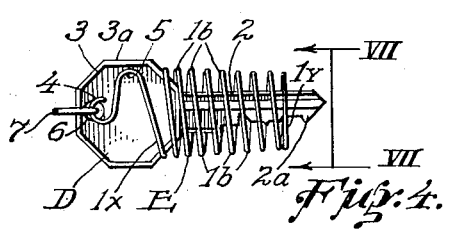
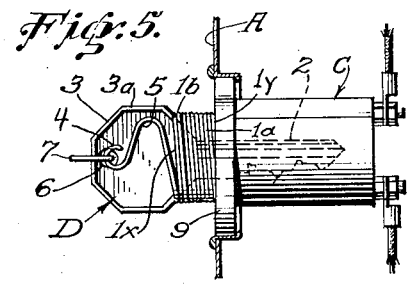
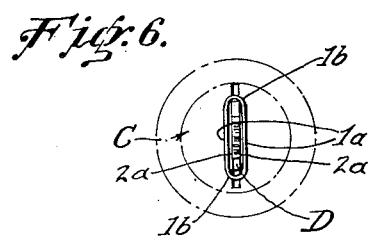
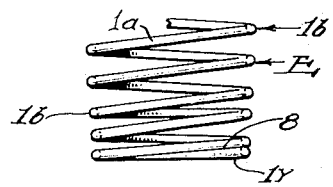
INVENTOR.
AUGUST MOEBES &
ALBERT BRIGGS,
BY
Munn, Liddy & Glaccum
ATTORNEYS Patented Feb. 21, 1950

2,498,288

UNITED STATES PATENT OFFICE 2,498,288

AUTOMATIC EJECTOR FOR KEYS

August Moebes and Albert Briggs, Sr.,
Vallejo, Calif.

Application April 6, 1948, Serial No. 19,194

1 Claim. (Cl. 70—414)

An object of our invention is to provide an automatic ejector for keys which is especially designed for automobile keys and in which the usual automobile key can be made into one that will automatically eject from the lock when the key is turned to shut off the ignition circuit to the engine. This is accomplished by anchoring a coil spring to the key, the coils of the spring encircling the key shank and being compressed when the key is inserted in the lock for closing the ignition circuit. The compressed spring coils have sufficient force to eject the key from the lock as soon as the key is turned to "off" position.

A further object of our invention is to provide a device of the type described which is extremely simple in construction and inexpensive to manufacture. The coil spring can be attached to the key without any alterations being necessary in the latter.

With such an automatic ejector for an automobile key, it is impossible for a motorist to lock himself out of his automobile. The number of cars stolen will also be reduced in number because the operators will not be able to leave their car keys in the ignition locks when turning off the engines.

The coils of the spring are preferably made rectangular in shape with the longer sides of the coils slidably contacting with the sides of the key shank so that the key and spring will take up practically no additional space other than that occupied by the key itself. This permits the key with its spring to be carried with a set of keys and not interfere with the normal use of any one of the keys. The spring is secured to the key by the same means that holds the car key and other keys together as a group, whether on a key ring, in a key container, etc.

Other objects and advantages will appear in the following specification, and the novel features of the device will be particularly pointed out in the appended claim.

Our invention is illustrated in the accompanying drawing, forming a part of the application, in which:

Figure 1 is a perspective view of a portion of an automobile interior and illustrates a key in the ignition lock in full lines and being ejected therefrom in dotted lines;

Figure 2 is a perspective view of the automatic key ejector;

Figure 3 is a side elevation of the key ejector shown slipped over a key shank, but not connected to the key;

Figure 4 is a view similar to Figure 3, but illustrates the automatic ejector connected to the key;

Figure 5 is a side elevation illustrating how the coil spring is compressed by the insertion of a key shank into a lock;

Figure 6 is an end view of Figure 4 and is looking in the direction of the arrows VI—VI of Figure 4; and Figure 7 is an enlarged view of the outer end of the coil spring.

While we have shown only the preferred form of our invention, it should be understood that various changes or modifications may be made within the scope of the appended claim without departing from the spirit and scope of the invention.

In carrying out our invention we have illustrated our spring ejector connected to an automobile key. Figure 1 shows a portion of the instrument board A of an automobile B. The ignition lock is indicated at C and is illustrated on a larger scale in Figure 5.

The automobile ignition key is shown full size at D in Figures 3, 4 and 5. We do not wish to be confined to an ignition key or any type of key because our invention can be used with any type of key where it is desired to have the key automatically ejected from the lock when the key is turned to unlocked position. The coil spring E for ejecting the key D from the lock is illustrated in Figure 2. The spring has coils 1 substantially rectangular in shape with curved ends. Figure 6 illustrates how the parallel sides 1a of the coils 1 slidably contact the opposite sides 2a of the key shank 2. Each spring coil 1 might be likened to a flattened loop with the parallel sides 1a and the semi-circular ends 1b forming a single coil.

The coil 1x disposed at the left hand end of the spring E shown in Figure 3, has its two curved portions 1b contacting the periphery 3a of the key head 3. The coil spring has a hook portion 4 whose plane parallels the sides of the key head or handle 3 and coincides with a plane cutting through one series of parallel coil sides 1a. The hook portion 4 is connected to the end loop 1x by a loop 5 and when the loop is in normal position and the arcuate loop ends 1b of the loop 1x contact the key handle periphery 3a, the hook will be out of registration with the hole 6 provided in the key head. Figure 3 illustrates this initial position of placing the coil spring E on the key D.

In Figure 4 the hook 4 has been moved farther away from the end coil 1x and receives the same ring or other support 7 that passes through the hole or eyelet 6. This movement places the loop 5 under tension and therefore the curved portions 1b of the lend loop 1x will yieldingly contact with the periphery 3a. A three point support for the coil spring E is provided in this manner. This is important because it will space the curved portions 1b of the coil 1 away from the key shank 2 and they will not interfere with the normal use of the key. As a further means for preventing the arced portions 1b of the loop 1 from contacting the key shank, we make each loop slightly smaller in length, starting with the loop 1x in Figure 3, and proceeding to the right. The side view of the coil spring resembles a truncated cone with the hook 4 depending from the base of the cone. A coil spring of this shape will have less tendency to have its outer end swing away from the longitudinal axis of the coil during the compressing of the spring than where the coils are all of the same shape.

Figure 7 illustrates the free end of the coil spring on a larger scale. This is done for the purpose of indicating how the outermost coil 1y has its end chamfered at 8 and the chamfered end contacts with the next adjacent coil so as to provide a smooth ending for the coil spring. The end coil 1y will also extend at right angles to the axis of the coil spring. The free end of the coil spring will not catch on any obstruction due to this particular arrangement.

From the foregoing description of the various parts of the device, the operation thereof may be readily understood. The key is placed in the lock in the usual manner. The coil spring when fully expanded does not project beyond the free end of the key shank, see Figure 4. The spring is compressed as the key shank is moved into the lock C, see Figure 5. The spring is compressed between the key handle 3 and the face 9 of the lock. The compressed spring is strong enough to eject the key from the lock when the key is freed. However, the key when inserted in the lock is rotated for turning on the ignition and the key is therefore secured in the lock and cannot be ejected so long as the ignition circuit remains closed.

As soon as the ignition is turned off by rotating the key back to its original position, the compressed spring will eject the key when it is released by the operator. Figure 1 indicates in dotted lines the key removed from the lock. It is impossible to turn off the ignition and leave the key in the lock.

The lengths of the spring coils 1 is less than the width of the key head. The key with the spring attached will take up no more appreciable space than the key alone. This permits the key to be carried like any other key even though the coil spring is secured thereto.

We claim:

The combination with a key having a shank adapted to be inserted into a lock and having a handle with an opening therein; of a coil spring encircling the shank and having a coil designed to contact at two points with the periphery of the key handle; the spring having a hook connected to said coil by a loop, the hook being disposed out of registry with the key handle opening when the coil contacts the periphery of the key handle; the loop being tensioned when the hook is aligned with the opening; a key support extending through said key handle opening and engaged by said hook thereby anchoring the spring to the key and providing a third contact point between spring and key.

AUGUST MOEBES.
ALBERT BRIGGS, Sr.

REFERENCES CITED

The following references are of record in the file of this patent:

UNITED STATES PATENTS

| Number | Name | Date |
|---|---|---|
| 475,515 | Phillips | May 24, 1892 |
| 644,221 | Wirt | Feb. 27, 1900 |
| 994,778 | O'Brien | Jan. 13, 1911 |
| 1,414,697 | Horras | May 2, 1922 |
| 1,745,836 | Miller et al. | Feb. 4, 1930 |
| 2,271,048 | Spiro | Jan. 27, 1942 |